United States Patent [19]
Oirschot

[11] Patent Number: 5,002,092
[45] Date of Patent: Mar. 26, 1991

[54] INLINE VENTURI FOR PNEUMATIC CONVEYING SYSTEMS

[76] Inventor: Frank V. Oirschot, 47 Algonquian Drive, Chatham, Ontario, Canada, N7M 5Y2

[21] Appl. No.: 418,628

[22] Filed: Oct. 10, 1989

[30] Foreign Application Priority Data

Jul. 24, 1989 [CA] Canada .................................. 606508

[51] Int. Cl.⁵ .............................................. B01F 5/04
[52] U.S. Cl. .................................... 137/891; 417/183
[58] Field of Search ......................... 137/891; 417/183

[56] References Cited

U.S. PATENT DOCUMENTS

| | | | |
|---|---|---|---|
| 1,233,991 | 7/1917 | Jardins | 417/183 |
| 1,806,287 | 5/1931 | Forrest | 417/183 |
| 1,854,098 | 4/1932 | Black | 417/183 |
| 2,794,447 | 6/1957 | Spitz | 137/891 X |
| 3,960,175 | 6/1976 | Liepe | 137/891 X |
| 4,186,772 | 2/1980 | Handleman | 137/891 |

FOREIGN PATENT DOCUMENTS 515188 2/1971 Switzerland ........................ 137/891

*Primary Examiner*—Robert G. Nilson

[57] ABSTRACT

The present invention provides an adjustable venturi device designed for efficient use with blowers of various different capacities. The venturi device of the present invention includes a blower feedable positive air passage and a negative pressure air inlet exposed to and operated by air draw from the positive air passage. The venturi device is adjustable for varying exposure of the air inlet to the positive air passage with resultant varying of the air draw according to capacity of the particular blower used with the venturi device.

3 Claims, 3 Drawing Sheets

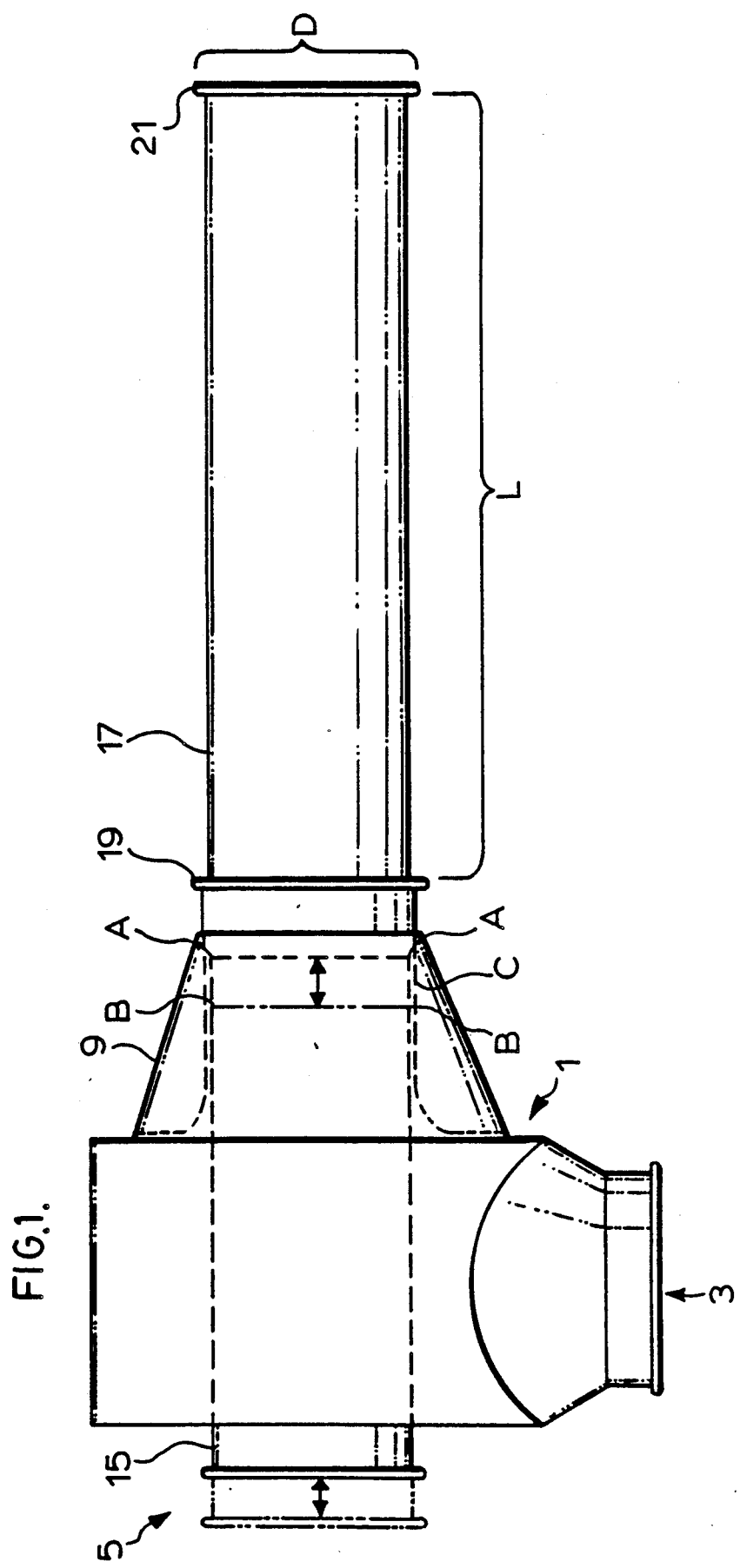

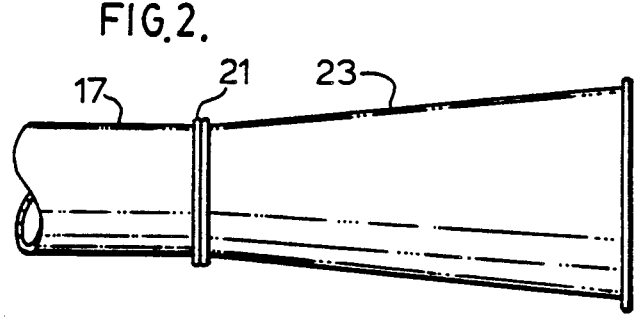
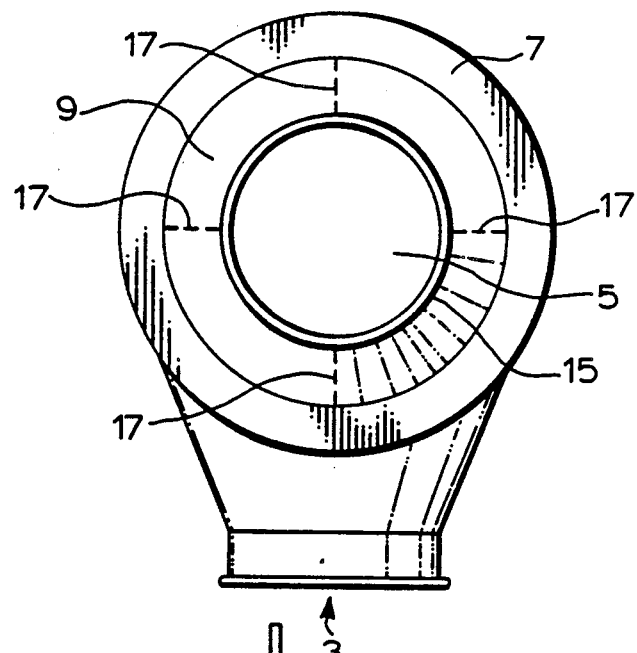
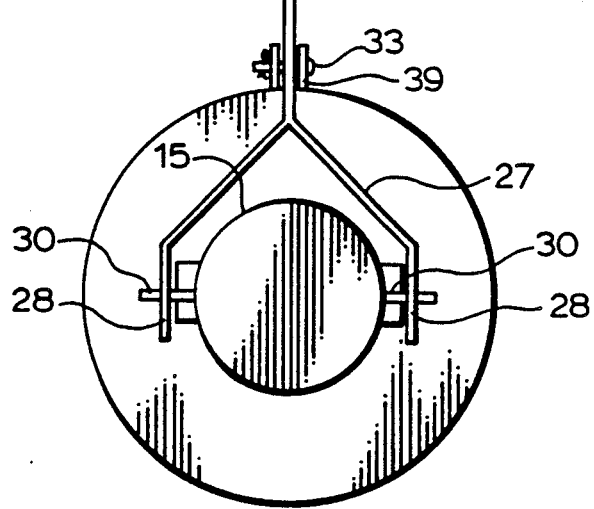

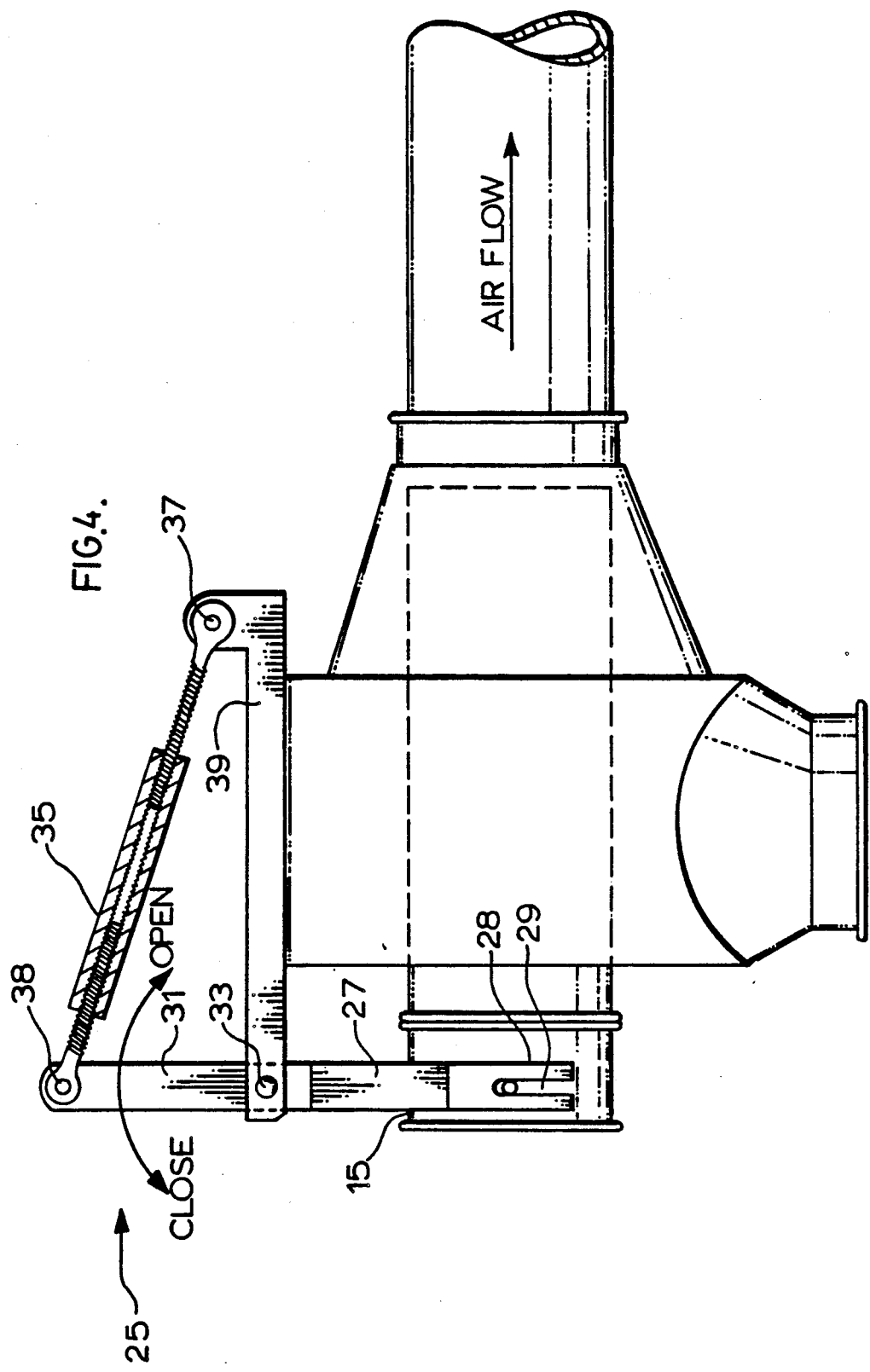

INLINE VENTURI FOR PNEUMATIC CONVEYING SYSTEMS

FIELD OF THE INVENTION

The present invention relates to an inline adjustable venturi device providing an air draw in a pneumatic system and also usable as an inline air boost in that pneumatic system. The novel aspect of the venturi device of the present invention resides in its ability to adjust for maximum efficiency according to the blower capacity used in the pneumatic system.

BACKGROUND OF THE INVENTION

There are many different types of systems which use venturi devices. The purpose of the venturi device is to provide an air draw or suction to draw in different types of products passed through a pneumatic feed system.

According to conventional construction, a venturi device has a fixed configuration and therefore is not adjustable according to the capacity of the particular blower used in the pneumatic feed system. In addition, the conventional venturi is not designed for adjustment for variable air draws which may be selected according to the product drawn into the pneumatic feed system.

SUMMARY OF THE PRESENT INVENTION

The present invention provides an inline adjustable venturi device for use in a blower operated pneumatic system and designed for efficient use with blowers of different capacities. The venturi device of the present invention includes a blower feedable positive air passage, a negative pressure air inlet exposed to and operated by air draw from the positive air passage and means for varying exposure of the air inlet to the positive air passage with a resultant varying of the air draw according to capacity of the particular blower used with the venturi device.

The venturi device of the present invention is therefore adjustable to accommodate not only different blower capacities but additionally to accommodate the air draw of different types of products into without having to change the venturi device.

BRIEF DESCRIPTION OF THE DRAWINGS

The above as well as other advantages and features of the present invention will be described in greater detail according to the preferred embodiments of the present invention in which;

FIG. 1 is a side view of a venturi device according to a preferred embodiment of the present invention and for use in a blower operated pneumatic feed system;

FIG. 2 is a side view of an air drawn enhancing pipe section useable with the venturi device of FIG. 1;

FIG. 3 is a front view looking into the venturi device of FIG. 1;

FIG. 4 is a side view of the venturi device of FIG. 1 with a mechanical arrangement for moving the telescopic section according to a further preferred embodiment of the present invention;

FIG. 5 is an end view showing the connection of the mechanical arrangement to the pipe section of FIG. 4.

DETAILED DESCRIPTION ACCORDING TO THE PREFERRED EMBODIMENTS OF THE PRESENT INVENTION:

FIG. 1 shows a venturi device generally indicated at 1. This venturi device fits directly into a pneumatic system such as a pneumatic feed system for different types of products. These products can range from solid to gaseous and even liquid products.

Venturi device 1 has a positive high pressure air feed generally indicated at 3 and to be coupled with a blower for the pneumatic feed system. Extending at generally right angles to the air feed 3 is a negative pressure air inlet generally indicated at 5. The amount of air draw at air inlet 5 is determined by its exposure relative to the high pressure air passage fed by the blower and described below in detail.

The overall venturi device comprises a main body portion 7 with an air flow region which includes a tapered and in particular a conical portion 9. Conical portion 9 preferably has a forward inward taper of about 20°. As will be immediately apparent from the drawings, this conical portion varies in its diameter and in particular, decreases in diameter towards its more tapered forward end.

The air inlet passage comprises an elongated pipe 15 which extends through body portion 7 and towards the conical portion 9. Pipe 15 is telescopic within body portion 7 and relative to conical portion 9. FIG. 1 shows the pipe 15 in two different positions. In one of these positions, the outer end of pipe 15 appearing to the left hand side of the Figure is moved farther outwardly away from body portion 7. This obviously affects the location of the inner end of the pipe which in this retracted setting is moved to position B relative to conical portion 9.

In the other setting, the outer end of pipe 15 is not as retracted so that the inner end of the pipe is set at position A relative to conical portion 9.

As can be seen in FIG. 3 of the drawings, the venturi device is provided with internal baffles 17 which guide the fitting of pipe 15 internally of the venturi device.

The adjustability of pipe 15 relative to conical portion 9 provides varying exposures, i.e. exposure of different diameters of the conical portion to through which the positive high pressure air can be fed. Pipe 15 has a solid construction. The pipe can be moved either mechanically or manually. It may be moved to the left in FIG. 1 to a position such as position A where it is very close to the smaller diameter region of cone portion 9 and in fact can be pushed into abutment with the conical portion to cut off all exposure of the air inlet relative to the positive air feed through the venturi device. However, pipe 15 can also be retracted such that its inner end moves away from the smaller diameter region to a larger diameter region in the conical portion 9. This is shown by position B where there is a substantial exposure completely around the pipe as indicated at C of the air inlet 5 to the high pressure air fed through the conical portion 9.

If the venturi device is used with a higher capacity blower, the pipe 15 is retracted farther to the left leaving a greater opening between its inner end and conical portion 9. If it is used with a lower capacity blower then the pipe is moved farther to the right closing the gap between its inner end and a smaller diameter region on the conical portion. Furthermore, as noted above, pipe 15 can be moved to the right to the point where its inner end actually contacts the inner surface of the conical portion to completely shut off the air draw through the pipe.

In operation, a blower is connected to the high pressure inlet 3 of the venturi device. When pipe 15 is in a retracted position, i.e. the inner end of the pipe pulled away from conical portion 9, the high pressure air from the blower blows up and around pipe 15 forwardly past the inner end of the pipe and through conical portion 9 into a further pipe section 17 to be described later in detail. This creates a cone or funnel shaped air flow surrounding the inner end of pipe 15 and blowing forwardly out of cone shape portion 9. The actual shape of the cone of air varies according to the degree to which pipe 15 is retracted. For example, in a relatively non-retracted position, where the inner end of the telescopic pipe is only slightly separated from conical portion 9, there is a relatively thin cone of air blowing past the inner end of pipe 15. This thin cone of air created by using a relatively small capacity blower is effective for creating a maximum suction within pipe 15 through use of that small capacity blower.

When moving to a higher capacity blower, the pipe is retracted further relative to conical portion 9. This results in an increase in the inner surface area of the conical air flow which improves the suction around the end of pipe 15. Therefore, the positioning of the telescopic pipe can be set for maximizing the efficiency of the different capacity blowers useable with the venturi device. The actual setting for the position of pipe 15 is determined by using accurate gauges. FIG. 1 shows a further pipe section 17 connected at its inner end 19 to the venturi device downstream of conical portion 9. This pipe section is used to straighten the air flow which, as noted above, emerges from the conical portion as a cone or funnel of air. In order to have the desired straightening effect on the air flow, i.e. to reduce air turbulence pipe section 17 has a length L, i.e. the distance between the inner end 19 and the outer end 21 of pipe section 17 which is 3½ to 4 times the diameter D of pipe section 17. These proportions are particularly effective in straightening and reducing turbulence of the air flow eminating from pipe section 17.

FIG. 2 shows a further pipe section 23 which connects to the outer end 21 of pipe section 17. As will be seen in FIG. 3, pipe section 23 is outwardly flared, preferably at an angle of about 4 degrees from horizontal and produces a static pressure regain which enhances the venturi effect at venturi device 1.

As earlier mentioned venturi device 1 can be used with various different types of pneumatic feed system. However, one particularly useful system is in the handling of expanded polystyrene which is packed in small particle sizes and used for furniture and the like and in the manufacture of STYROFOAM sheets as the STYROFOAM sheets are made of small balls of expanded polystyrene. According to conventional practice the packing of the expanded polystyrene unfortunately results in the impacting of the product along the packing route, thereby increasing its density and substantially decreasing its volumn. However, with the present invention, through the provision of an adjustable air draw, the venturi device can be set up with a very specific draw at a level and in a generally straight path for a much more gentle handling of the expanded polystyrene which maintains its low density and high volume characteristics desirable from both a manufacturing and a cost saving standpoint.

The venturi device of the present invention is also particularly suitable for the handling of long stringy type material as well as large components such as plastic bottles and foam strips which generally cannot be handled by an air lock system since these materials have a tendancy to wrap around the air lock paddles thereby causing them to become plugged. The venturi device of the present invention therefore makes it possible to handle many materials which are not presently suited to be handled by conventional air pick up systems.

As will be apparent from the drawings, the venturi, i.e. the negative draw passage through pipe 15 is not restricted to material flow as the draw passage is of consistent diameter from the outer end of pipe section 15 to the end 21 of pipe section 17. From here the pipe section 23 actually diverges outwardly to eliminate any restrictions along the draw passage even in view of the use of cone section 9 for creating the venturi effect.

In another set up the venturi device is useable for the handling of chemicals and in particular caustic gases and the like. In order to handle these types of products, the venturi device is made from a corrosion resistant material such as stainless steel.

As noted above, adjustment, both inwardly and outwardly of the telescopic pipe, can be done either manually or mechanically. It can also be done pneumatically. One particularly good adjustment device is in the form of a lever operated on the pipe. Another adjustment method uses a threaded connection of the pipe in the device which provides very accurate positioning of the pipe. It also ensures a very positive seal or interlock between the pipe and the main body of the venturi device. To enhance sealing properties O-ring seals etc., may be provided around the pipe internally of the device.

FIGS. 4 and 5 show a preferred embodiment mechanical arrangement generally indicated at 25 for adjusting the position of pipe 15. This arrangement comprises a yoke-like fitting 27 having a pair of downwardly extending arm sections 28 mounted by means of standoff mounts 30 to pipe section 15. The standoff mounts allow a swinging action of yoke 27 relative to pipe 15 to be described later in detail.

Extending upwardly from yoke 27 is a rod 31 pivotally secured at 33 to a support 39 for the mechanical adjuster. The pivotal mount 33 can be made, for example by means of a pin and cotter key assembly.

A control piston 35 is pivotally secured at one end 38 to rod 31 and at its other end 37 to support 39. This cylinder can either be expanded or contracted which results in either inward or outward movement respectively of pipe 15 as described immediately below.

By expanding or lengthening piston 35, the upper end of rod 31 is forced to move towards the left in FIG. 4. Because of the pivotal mounting of rod 31 at 33 to support 39, this expansion of the piston results in the lower end of rod 31, where connected to yoke 27, to move towards the right in FIG. 4 causing pipe 15 to move inwardly within the venturi device. In order to compensate for the different angular positions of rod 31 relative to pipe 15, yoke 27 is allowed to swing about pivotal mounts 30 and has sufficient clearance relative to pipe 15 so as to avoid contact with the pipe. In addition, the arms 28 of yoke 27 are provided with vertical slots 29 as seen in FIG. 4 which allows the yoke to move up and down relative to the pivot mounts 30 as will occur because of the different angular positions while still maintaining the required fitting of the pivot mounts within arms 28.

When it is desired to move pipe 15 to a more retracted position outwardly of the venturi device, piston 35 is contracted, i.e. shortened, pulling the end of rod 31 to the right in FIG. 4 and causing its lower end to pivot outwardly away from the venturi device while pulling the pipe 15 outwardly with it in the same manner as described above but in the opposite direction.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A blower operated venturi device designed for efficient use with blowers of different capacities, said venturi device having a blower feedable positive air chamber including a conical region terminating in an air outlet from said chamber, an axially movable negative pressure air inlet pipe in said chamber, said air inlet pipe having a non tapered downstream end which is surrounded by said conical region and directed at said air outlet of said chamber, said air outlet of said chamber having a diameter at least as great as that of said downstream end of said inlet pipe, an air straightening and turbulence reducing pipe connected to said air outlet of said chamber, said air straightening and turbulence reducing pipe being aligned with, and having at least as great a diameter as that of said air inlet pipe, the diameter of said air straightening and turbulence reducing pipe being constant over the length thereof, with the length of said air straightening and turbulence reducing pipe being 3.5 to 4 times its diameter, and said air straightening and turbulence reducing pipe terminating at an outwardly divergent static regain expansion chamber.

2. A venturi device as claimed in claim 1, wherein said conical region has an inward taper of about 20 degrees.

3. A blower operated venturi device as claimed in claim 1 wherein said static regain expansion chamber diverges outwardly by about 4° from said air straightening and turbulence reducing pipe.

* * * * *